United States Patent
Tang et al.

(10) Patent No.: US 9,943,875 B2
(45) Date of Patent: Apr. 17, 2018

(54) WATER VALVE AND DRINKING DEVICE

(71) Applicants: HEFEI HUALING CO., LTD., Hefei (CN); HEFEI MIDEA REFRIGERATOR CO., LTD., Hefei (CN)

(72) Inventors: Tao Tang, Hefei (CN); Shuisheng Peng, Hefei (CN); Jianhai Zhang, Hefei (CN); Yanping Li, Hefei (CN)

(73) Assignees: HEFEI HUALING CO., LTD., Hefei (CN); HEFEI MIDEA REFRIGERATOR CO., LTD., Hefei (CN)

(*) Notice: Subject to any disclaimer, the term of this patent is extended or adjusted under 35 U.S.C. 154(b) by 0 days.

(21) Appl. No.: 15/128,122

(22) PCT Filed: Nov. 7, 2014

(86) PCT No.: PCT/CN2014/090622
§ 371 (c)(1),
(2) Date: Sep. 22, 2016

(87) PCT Pub. No.: WO2015/143877
PCT Pub. Date: Oct. 1, 2015

(65) Prior Publication Data
US 2017/0095832 A1 Apr. 6, 2017

(30) Foreign Application Priority Data
Mar. 24, 2014 (CN) .......................... 2014 1 0111969

(51) Int. Cl.
*B05C 11/10* (2006.01)
*F16K 23/00* (2006.01)
(Continued)

(52) U.S. Cl.
CPC ........ *B05C 11/1026* (2013.01); *B65D 47/248* (2013.01); *B67C 3/2637* (2013.01); *F16K 23/00* (2013.01)

(58) Field of Classification Search
CPC ... B05C 11/1026; F16K 23/00; B65D 47/247; B65D 47/248; B67C 3/26; B67C 3/2637
(Continued)

(56) References Cited

U.S. PATENT DOCUMENTS 966,270 A * 8/1910 Van Leir ............... B67C 3/2637
141/354
2,504,276 A * 4/1950 Olsen ................... B65D 47/248
222/482

(Continued)

FOREIGN PATENT DOCUMENTS

CN 2886241 Y 4/2007
CN 202567825 U 12/2012
(Continued)

OTHER PUBLICATIONS

International Searching Authority, International Search Report for PCT/CN2014/090622 dated Jan. 14, 2015.
(Continued)

*Primary Examiner* — J. Casimer Jacyna
(74) *Attorney, Agent, or Firm* — Hodgson Russ LLP

(57) ABSTRACT

A water valve and a drinking device are provided. The water valve includes an upper support, a lower support, a valve spool, a sealing member, a spring and a water outlet. The upper support is provided with a water inlet. The lower support is provided with a water outlet and a vent hole. The valve spool has a first end connected with the upper support and a second end fixedly connected with the lower support, and the valve spool is movable relative to the upper support, to switch on or off a communication between the water inlet
(Continued)

and the water outlet. When the water valve is at a state of discharging water, an interior of the water outlet pipe is not communicated with atmosphere; when the water valve is at a state of not discharging water, the vent hole communicates the interior of the water outlet pipe with the atmosphere.

18 Claims, 4 Drawing Sheets

(51) Int. Cl.
  *B67C 3/26* (2006.01)
  *B65D 47/24* (2006.01)
(58) Field of Classification Search
  USPC .......................................................... 141/357
  See application file for complete search history.

(56) References Cited

U.S. PATENT DOCUMENTS

| | | | | |
|---|---|---|---|---|
| 3,278,094 A | * | 10/1966 | Perry | B65D 47/283 141/291 |
| 4,442,873 A | * | 4/1984 | Yun | B67C 3/08 141/183 |
| 4,667,710 A | * | 5/1987 | Wu | B67B 7/26 141/198 |
| 5,234,038 A | * | 8/1993 | Mitchell | B67D 7/54 141/291 |
| 5,259,423 A | * | 11/1993 | Simmel | B65B 39/04 141/1 |

FOREIGN PATENT DOCUMENTS

| | | |
|---|---|---|
| CN | 103291956 A | 9/2013 |
| CN | 203468347 U | 3/2014 |
| CN | 103697175 A | 4/2014 |
| CN | 103697176 A | 4/2014 |
| CN | 203762901 U | 8/2014 |
| CN | 203885324 U | 10/2014 |
| DE | 102008052277 B3 | 4/2010 |
| KR | 2020090007830 U | 8/2009 |

OTHER PUBLICATIONS

EPO, Extended European Search Report for EP App. No. 14887686 dated Nov. 28, 2017.

* cited by examiner

WATER VALVE AND DRINKING DEVICE

CROSS-REFERENCE TO RELATED APPLICATIONS

The present application is a national phase entry under 35 USC § 371 of International Application PCT/CN2014/090622, filed Nov. 7, 2014, which claims the benefit of and priority to Chinese Patent Application No. 201410111969.6 filed Mar. 24, 2014, the entire disclosure of which is incorporated herein by reference.

FIELD

The present disclosure relates to a field of household appliances, and more particularly to a water valve and a drinking device having the same.

BACKGROUND

In the related art, structures of a traditional drinking devices have the following problems:

1. after a water valve is switched off, a little residual water still remains at a water outlet;
2. the water outlet is not easy to be sealed, and needs to be sealed by a complex structure, thus tending to result in problems such as a low water discharging velocity, a water leakage, and a water dripping after getting water; and
3. a lot of parts are to be assembled and an assembling process thereof is complicated, the assembled parts are not easy to be disassembled, and a cost thereof is high.

SUMMARY

The present disclosure seeks to solve at least one of the problems existing in the related art to at least some extent. For this reason, an objective of the present disclosure is to provide a water valve, the water valve has a simple structure and no residual water remains on an inner wall of a water outlet pipe.

Another objective of the present disclosure is to provide a drinking device including the above-mentioned water valve.

Embodiments of a first aspect of the present disclosure provide a water valve, used for a drinking device, including: an upper support connected with the drinking device and provided with a water inlet; a lower support connected with the upper support, movable relative to the upper support, and provided with a water outlet and a vent hole, the vent hole being communicated with the water outlet; a valve spool having a first end connected with the upper support and a second end fixedly connected with the lower support, in which the valve spool is movable relative to the upper support, to switch on or off a communication between the water inlet and the water outlet; a sealing member fitted over the first end of the valve spool connected with the upper support; a spring disposed between the upper support and the lower support; and a water outlet pipe connected with the lower support and communicated with the water outlet, in which when the water valve is at a state of discharging water, an interior of the water outlet pipe is not communicated with atmosphere; when the water valve is at a state of not discharging water, the vent hole communicates the interior of the water outlet pipe with the atmosphere.

The water valve according to embodiments of the present disclosure, has a simple structure and a low cost, and is easy to be disassembled and assembled. Meanwhile, when the water valve is at the state of not discharging water, the vent hole formed in the lower support communicates the water outlet with the atmosphere, so as to enable a pressure in the interior of the water outlet pipe to be equal to a atmosphere pressure, such that water remained in the water outlet pipe quickly flows out from the water outlet pipe under an action of gravity, thus keeping the water outlet pipe clean and dry, solving a problem that water drops remained on the water outlet pipe are contaminated by dust and bacterium in air, which thereby results in a contaminated drinking water, and therefore improving a market competitiveness of the device.

According to an embodiment of the present disclosure, a diameter of the water outlet pipe ranges from 6 mm to 15 mm.

According to an embodiment of the present disclosure, the diameter of the water outlet pipe is 10 mm.

According to an embodiment of the present disclosure, the first end of the valve spool connected with the upper support is provided with an annular groove, and the sealing member is located in the annular groove.

According to an embodiment of the present disclosure, the sealing member is configured as a silicone sealing member.

According to an embodiment of the present disclosure, the lower support is provided with a snap, the valve spool is provided with a snapping groove configured to be fitted with the snap, and the valve spool is fixedly connected with the lower support through a fit between the snap and the snapping groove.

According to an embodiment of the present disclosure, the water outlet pipe includes a first pipe segment connected with the lower support; and a second pipe segment connected with the first pipe segment and obliquely arranged relative to the first pipe segment.

According to an embodiment of the present disclosure, an included angle between the first pipe segment and the second pipe segment ranges from 30° to 60°.

According to an embodiment of the present disclosure, the water outlet pipe is configured as an integrated structure formed by injection molding.

Embodiments of a second aspect of the present disclosure provide a drinking device, including the water valve according to embodiments of the first aspect of the present disclosure.

The drinking device according to embodiments of the present disclosure, by adopting the water valve of the embodiments of the first aspect, solves a problem that water drops remained on the water outlet pipe are contaminated by the dust and bacterium in air, which thereby results in the contaminated drinking water, therefore improving the market competitiveness of the product.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
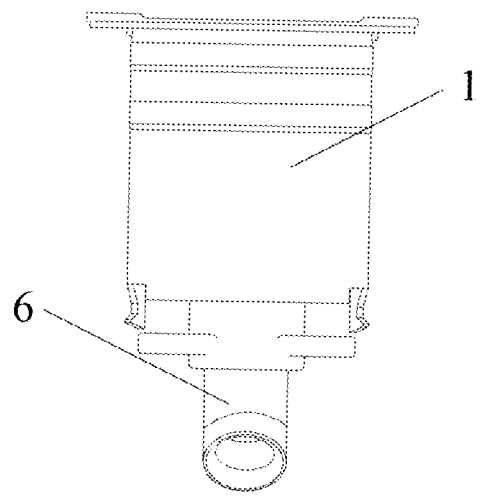
FIG. 1 is a schematic view of a water valve according to embodiments of the present disclosure.

REFERENCE NUMERALS 1 upper support; 101 water inlet; 2 lower support; 201 water outlet; 202 vent hole; 203 snap; 3 valve spool; 301 annular groove; 302 snapping groove; 4 sealing member; 5 spring; 6 water outlet pipe; 601 first pipe segment; 602 second pipe segment.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

It should be noted that, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

A water valve according to some embodiments of the present disclosure is described below with reference to FIGS. 1-7.

Figure 2:
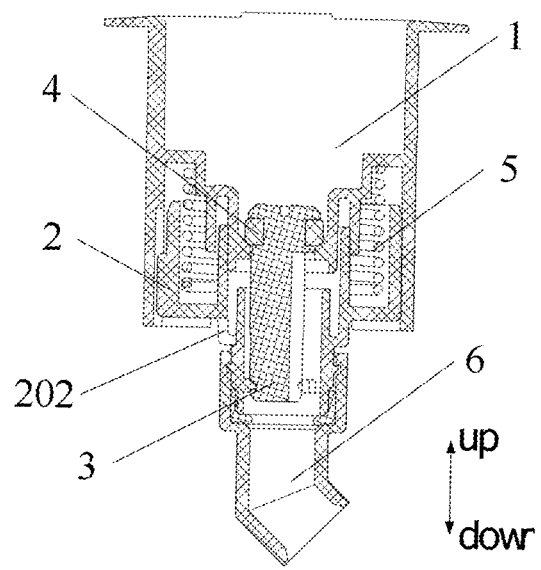
FIG. 2 is a sectional view of the water valve shown in FIG. 1, in which the water valve is at a state of not discharging water.
Figure 3:
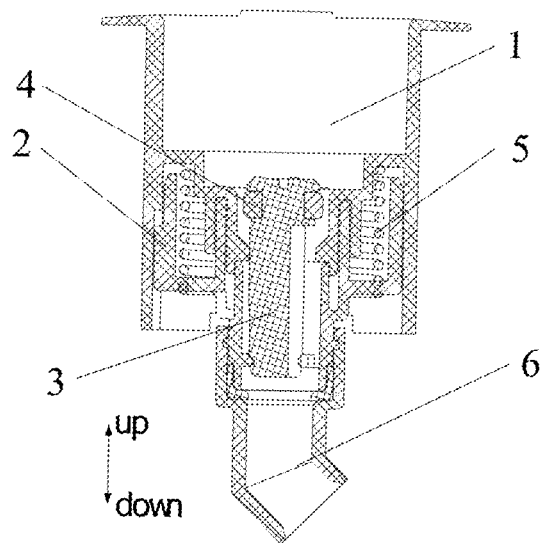
FIG. 3 is a sectional view of the water valve shown in FIG. 1, in which the water valve is at a state of discharging water.
Figure 4:
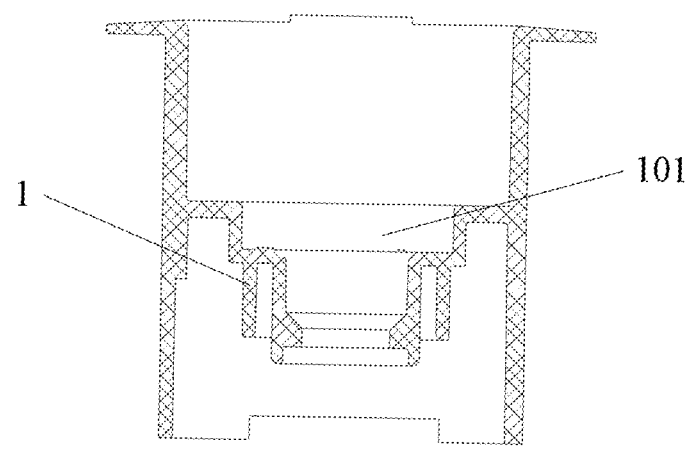
FIG. 4 is a sectional view of an upper support shown in FIG. 2.

As shown in FIGS. 1, 2 and 3, the water valve includes an upper support 1, a lower support 2, a valve spool 3, a sealing member 4, a spring 5, and a water outlet pipe 6.

As shown in FIGS. 1-4, the upper support 1 is connected with a drinking device, and the upper support 1 is provided with a water inlet 101; as shown in FIGS. 1, 2, 3 and 5, the lower support 2 is connected with the upper support 1, and is movable relative to the upper support 1, the lower support 2 is provided with a water outlet 201 and a vent hole 202, and the vent hole 202 is communicated with the water outlet 201; as shown in FIGS. 2 and 3, a first end of the valve spool 3 is connected with the upper support 1, a second end of the valve spool 3 is fixedly connected with the lower support 2, and the valve spool 3 is movable relative to the upper support 1, so as to switch on or off a communication between the water inlet 101 and the water outlet 201; as shown in FIGS. 2 and FIG. 3, the sealing member 4 is fitted over the first end of the valve spool 3 connected with the upper support 1; as shown in FIGS. 2 and FIG. 3, the spring 5 is disposed between the upper support 1 and the lower support 2; the water outlet pipe 6 is connected with the lower support 2 and communicated with the water outlet 201; when the water valve is at a state of discharging water, an interior of the water outlet pipe 6 is not communicated with atmosphere, when the water valve is at a state of not discharging water, the vent hole 202 communicates the interior of the water outlet pipe 6 with the atmosphere.

The water valve according to embodiments of the present disclosure, has a simple structure and a low cost, and is easy to be disassembled and assembled. Meanwhile, when the water valve is at the state of not discharging water, the vent hole 202 formed in the lower support 2 communicates the water outlet 201 with the atmosphere, so as to enable a pressure in the interior of the water outlet pipe 6 to be equal to an atmosphere pressure, such that water remained in the water outlet pipe 6 quickly flows out from the water outlet pipe 6 under an action of gravity, thus keeping the water outlet pipe 6 clean and dry, solving a problem that water drops remained in the water outlet pipe 6 are contaminated by dust and bacterium in air, which thereby results in a contaminated drinking water, and therefore improving a market competitiveness of the device.

In an embodiment of the present disclosure, a diameter of the water outlet pipe 6 ranges from 6 mm to 15 mm. Preferably, the diameter of the water outlet pipe 6 is 10 mm.

In the embodiment, under an action of water surface tension, the water remained in the pipe forms a water drop on an inner wall thereof. Relative to the water outlet pipe 6 of a small diameter, the water drop on the inner wall of the water outlet pipe 6 with a large diameter has a relatively small contact area with the inner wall, so an adhesive force of the water drop is small, and thus it is much easier for the water drop to slip out of the inner wall of the water outlet pipe 6.

In an embodiment of the present disclosure, the first end of the valve spool 3 connected with the upper support 1 is provided with an annular groove 301, and the sealing member 4 is located in the annular groove 301. Preferably, the sealing member 4 is configured as a silicone sealing member 4.

In the embodiment, the sealing member 4 is mounted in the annular groove 301, thus ensuring a firm installation between the sealing member 4 and the valve spool 3. Under an action of the spring 5, the sealing member 4 is fitted with the upper support 1 more closely, thus enabling the sealing between the valve spool 3 and the upper support 1 to be much tighter.

Figure 5:
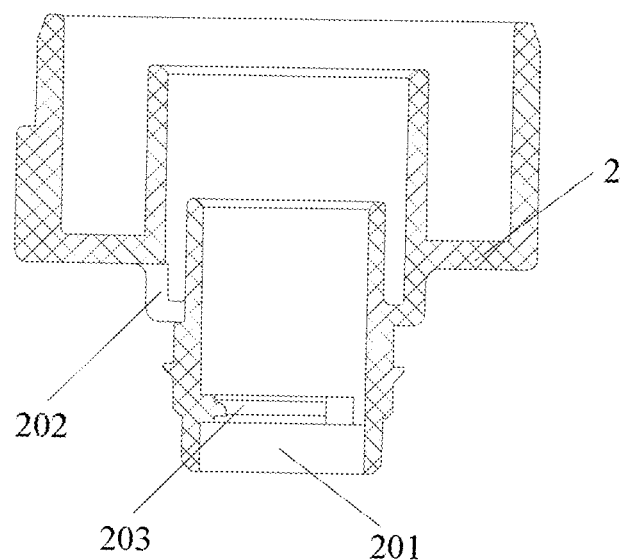
FIG. 5 is a sectional view of a lower support shown in FIG. 2.
Figure 6:
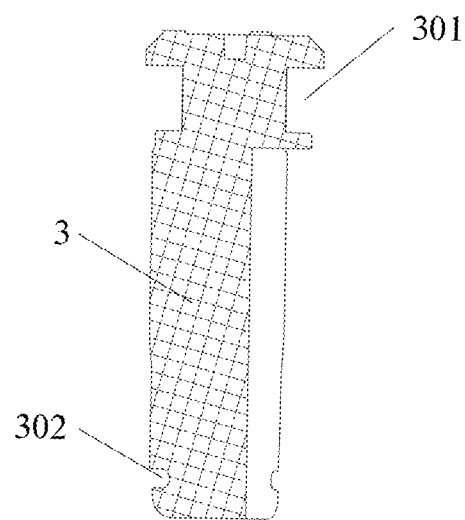
FIG. 6 is a sectional view of a valve spool shown in FIG. 2.
Figure 7:
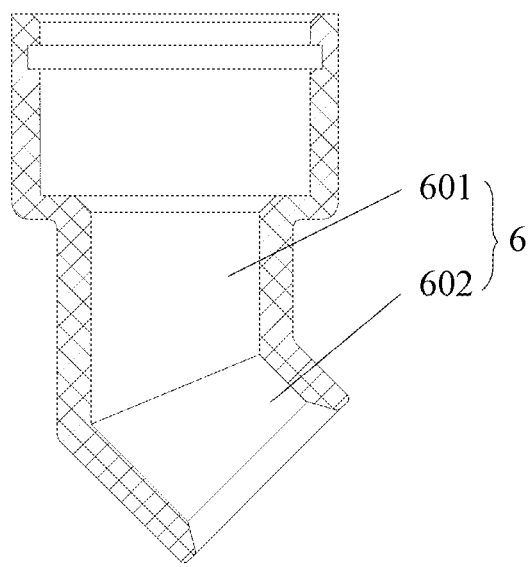
FIG. 7 is a sectional view of a water outlet pipe shown in FIG. 2.

In a specific embodiment of the present disclosure, as shown in FIG. 5, the lower support 2 is provided with a snap 203, and as shown in FIG. 6, the valve spool 3 is provided with a snapping groove 302 fitted with the snap 203. As shown in FIGS. 2 and 3, the valve spool 3 is fixedly connected with the lower support 2 through a fit between the snap 203 and the snapping groove 302.

In the embodiment, in the case of meeting the requirement of use intensity, a fixed connection manner using the snap 203 and the snapping groove 302 provides a simple structure as well as easy assembling and disassembling, thus effectively improving a production efficiency and reducing a production and manufacturing cost.

In an embodiment of the present disclosure, the water outlet pipe 6 includes a first pipe segment 601 and a second pipe segment 602, the first pipe segment 601 is connected with the lower support 2, and the second pipe segment 602 is connected with the first pipe segment 601 and obliquely arranged relative to the first pipe segment 601. Preferably, an included angle between the first pipe segment 601 and the second pipe segment 602 ranges from 30° to 60°.

In the embodiment, since the included angle exists between the first pipe segment 601 and the second pipe segment 602, the second pipe segment 602 can extend out of the drinking device, thus facilitating getting water by a user.

In an embodiment of the present disclosure, the water outlet pipe 6 is configured as an integrated structure formed by injection molding.

In the embodiment, the first pipe segment 601 and the second pipe segment 602 are configured as the integrated structure. On one hand, a connection strength between the first pipe segment 601 and the second pipe segment 602 is increased, thus reducing a probability of fracture to occur between the first pipe segment 601 and the second pipe segment 602, and thereby enhancing use reliability of the water outlet pipe 6. On the other hand, the water outlet pipe 6 may be produced in batch, thus improving the production efficiency, and lowering the production and manufacturing cost.

A use process of the water valve of the present disclosure is described below in combination with FIG. 2 and FIG. 3.

As shown in FIG. 3, when a drinking device is used to discharge water, the lower support 2 is moved upward to compress the spring 5, and the valve spool 3 is moved together with the lower support 2, thus enabling the water inlet 101 of the upper support 1 and the water outlet 201 of the lower support 2 to be communicated with each other. As shown in FIG. 2, after getting water, the water valve is switched off and the spring 5 returns to its initial shape, so as to enable the lower support 2, the water outlet pipe 6, the valve spool 3 and the sealing member 4 to move downward, so that the sealing member 4 plugs up the water inlet 101 of the upper support 1, and thus water cannot continue flowing out. At the same time, because of the vent hole 202 formed in the lower support 2, the pressure in the interior of the water outlet pipe 6 is enabled to be equal to the atmosphere pressure, and thus the water drops remained in the water outlet pipe 6 flow out rapidly under the action of gravity.

The present disclosure further provides a drinking device, including the water valve according to above embodiments of a first aspect of the present disclosure.

The drinking device according to embodiments of the present disclosure, by adopting the water valve of the embodiments of the first aspect, solves the problem water drops remained in the water outlet pipe 6 are contaminated by the dust and bacterium in air, which thereby results in the contaminated drinking water, therefore improving the market competitiveness of the product.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A water valve, used for a drinking device, comprising:
   an upper support connected with the drinking device and provided with a water inlet;
   a lower support connected with the upper support, movable relative to the upper support, and provided with a water outlet and a vent hole, the vent hole being communicated with the water outlet;
   a valve spool having a first end connected with the upper support and a second end fixedly connected with the lower support, in which the valve spool is movable relative to the upper support, to switch on or off a communication between the water inlet and the water outlet;
   a sealing member fitted over the first end of the valve spool connected with the upper support;
   a spring disposed between the upper support and the lower support; and
   a water outlet pipe connected with the lower support and communicated with the water outlet,
   wherein when the water valve is at a state of discharging water, an interior of the water outlet pipe is not communicated with atmosphere; when the water valve is at a state of not discharging water, the vent hole communicates the interior of the water outlet pipe with the atmosphere.

2. The water valve according to claim 1, wherein a diameter of the water outlet pipe ranges from 6 mm to 15 mm.

3. The water valve according to claim 2, wherein the diameter of the water outlet pipe is 10 mm.

4. The water valve according to claim 2, wherein the first end of the valve spool connected with the upper support is provided with an annular groove, and the sealing member is located in the annular groove.

5. The water valve according to claim 4, wherein the sealing member is configured as a silicone sealing member.

6. The water valve according to claim 4, wherein the lower support is provided with a snap, the valve spool is provided with a snapping groove configured to be fitted with the snap, and the valve spool is fixedly connected with the lower support through a fit between the snap and the snapping groove.

7. The water valve according to claim 1, wherein the water outlet pipe comprises:
   a first pipe segment connected with the lower support; and
   a second pipe segment connected with the first pipe segment and obliquely arranged relative to the first pipe segment.

8. The water valve according to claim 7, wherein an included angle between the first pipe segment and the second pipe segment ranges from 30° to 60°.

9. The water valve according to claim 8, wherein the water outlet pipe is configured as an integrated structure formed by injection molding.

10. A drinking device, comprising a water valve, wherein the water valve comprises:
- an upper support connected with the drinking device and provided with a water inlet;
- a lower support connected with the upper support, movable relative to the upper support, and provided with a water outlet and a vent hole, the vent hole being communicated with the water outlet;
- a valve spool having a first end connected with the upper support and a second end fixedly connected with the lower support, in which the valve spool is movable relative to the upper support, to switch on or off a communication between the water inlet and the water outlet;
- a sealing member fitted over the first end of the valve spool connected with the upper support;
- a spring disposed between the upper support and the lower support; and
- a water outlet pipe connected with the lower support and communicated with the water outlet,
- wherein when the water valve is at a state of discharging water, an interior of the water outlet pipe is not communicated with atmosphere; when the water valve is at a state of not discharging water, the vent hole communicates the interior of the water outlet pipe with the atmosphere.

11. The drinking device according to claim 10, wherein a diameter of the water outlet pipe ranges from 6 mm to 15 mm.

12. The drinking device according to claim 11, wherein the diameter of the water outlet pipe is 10 mm.

13. The drinking device according to claim 11, wherein the first end of the valve spool connected with the upper support is provided with an annular groove, and the sealing member is located in the annular groove.

14. The drinking device according to claim 13, wherein the sealing member is configured as a silicone sealing member.

15. The drinking device according to claim 13, wherein the lower support is provided with a snap, the valve spool is provided with a snapping groove configured to be fitted with the snap, and the valve spool is fixedly connected with the lower support through a fit between the snap and the snapping groove.

16. The drinking device according to claim 10, wherein the water outlet pipe comprises:
- a first pipe segment connected with the lower support; and
- a second pipe segment connected with the first pipe segment and obliquely arranged relative to the first pipe segment.

17. The drinking device according to claim 16, wherein an included angle between the first pipe segment and the second pipe segment ranges from 30° to 60°.

18. The drinking device according to claim 17, wherein the water outlet pipe is configured as an integrated structure formed by injection molding.

* * * * *